Figure 1:
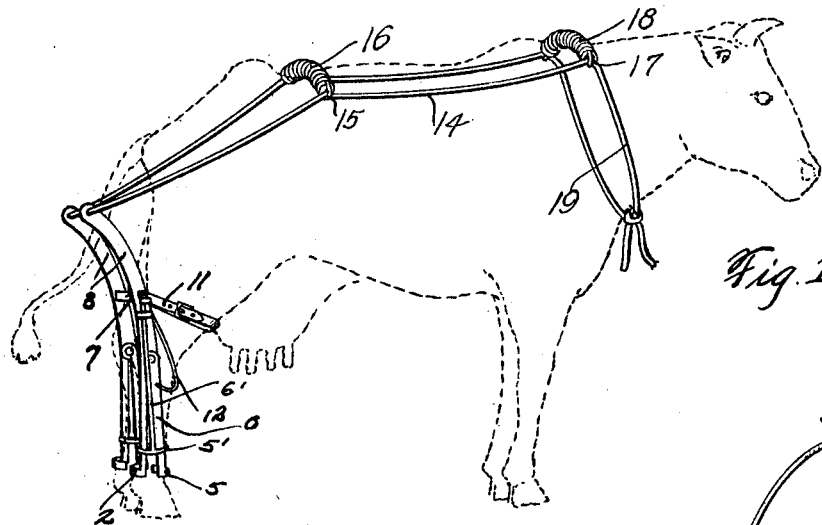

A. L. GROVE.
RESTRAINING DEVICE.
APPLICATION FILED JAN. 7, 1918.

1,270,814.

Patented July 2, 1918.

Inventor
A. L. Grove

UNITED STATES PATENT OFFICE.

ANTON L. GROVE, OF HOT SPRINGS, MONTANA.

RESTRAINING DEVICE.

1,270,814.  Specification of Letters Patent.  Patented July 2, 1918.

Application filed January 7, 1918. Serial No. 210,643.

*To all whom it may concern:*

Be it known that I, ANTON L. GROVE, a citizen of the United States, residing at Hot Springs, in the county of Sanders, State of Montana, have invented certain new and useful Improvements in Restraining Devices; and I do hereby declare the following to be a full, clear, and exact description of the invention, such as will enable others skilled in the art to which it appertains to make and use the same.

This invention relates to animal restraining devices.

The object of the invention is to provide an improved form of hoppling device which is particularly adapted for restraining cows from kicking during the milking operation, and in carrying out the above object, it is the intention to provide a hoppling harness by means of which the animal will be permitted to walk without serious discomfort, but will be effectively prevented from moving either leg for the purpose of kicking.

With the above objects in view, and such others relating to the details of construction, as may hereinafter appear, my invention will now be fully set forth and described, reference being had to the accompanying drawings.

In the drawings:—

Figure 2:
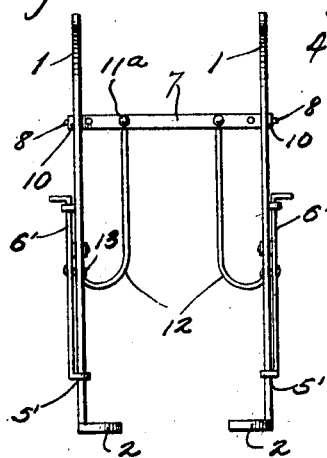
Figure 3:
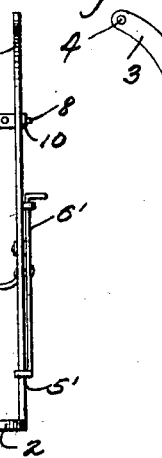
Figure 4:
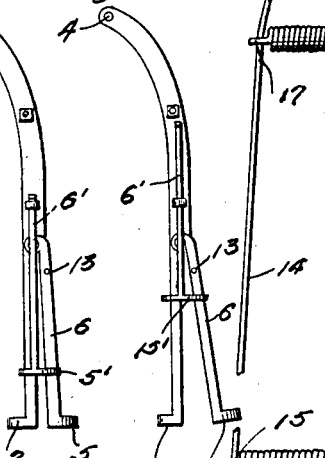
Figure 5:
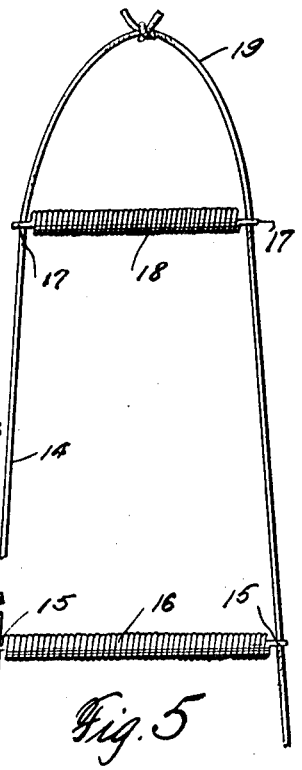
Figure 6:
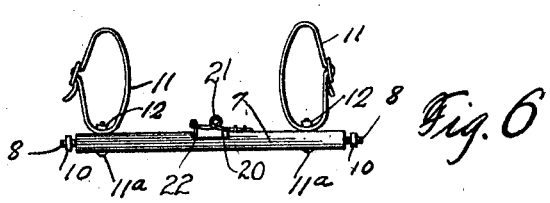

Figure 1 is a perspective view of the harness in operative position, the outline of a cow being dotted in order to show the use of the device, Fig. 2 is an enlarged rear elevation of the hoppling elements, Fig. 3 is a side elevation thereof, Fig. 4 is a detail view of one of the side elements in open position, Fig. 5 is an enlarged detail view of the top of the harness mechanism, and Fig. 6 is an enlarged detail view of a connecting or cross bar.

Referring more particularly to the drawings, 1 represents each of a pair of side bars which are of such length as to extend from the hock of the leg to a point just below the thigh. At their lower ends, each of the side bars 1 is shaped into a substantially semi-circular clamp member 2, and at its upper end is turned rearwardly into a horn 3 which has the eye 4. The semi-circular clamp members 2 extend to one side of their respective side bars, and coöperate with complementary clamp members 5 which are carried by the lower ends of shanks 6 which are hinged to the side bars 1 so that the clamp members may be separated. In order to hold the members 2 and 5 in their closed positions, a clamp ring 5′ surrounds the bar 1 and the shank 6, so that it may be slid downwardly therearound to lock them together. The rings 5′ carry the upward extensions 6′ which operate in suitable guides carried by the side bars.

The side bars 1 are carried upon a cross bar 7 which terminates in the longitudinally extended bolts 8. Said bolts 8 are projected through bearing openings formed in the side bars 1, and are therein held by means of nuts or other fastenings 10.

The cross bar 7 has secured to one of its faces a pair of straps 11 which are of the proper length to be strapped around the legs of the cow above the joint. The strap loops 11 are secured to the bar by bolts 11ª passed through said bar adjacent its ends, and these bolts also form securing means for the upper ends of flexible connections 12 which, as shown in Fig. 1, are adapted to be wound downwardly about the animal's legs and secured at the lower ends to eyes 13 formed in the shanks 6 adjacent the point of connection between said shanks and the bars 1, to thus limit relative movement of the bars 1 and cross bar 7.

Secured to the eyes or rings 4 are the ends of a rope or cable 14 which is also passed through eyes 15 at the opposite ends of a spring 16 and the eyes 17 at the ends of a spring 18, after which the bight of the cable is passed in a loop 19 around the cow's neck. The springs 16 and 18 pass transversely across the cow's back, and act as spacing members whose flexibility permits the elements to conform to the irregularities of the cow's back. There is thereby formed a harness which supports the bars 1, and also acts to draw one bar 1 against the cow's leg when an attempt is made to kick out with the other, thereby restraining the kicking action. Also, the straps or connections 12 act as limiting means to the free movement of the animal's legs. It should be noted that the springs 16 and 18 also act as tensioning devices in order to take up any slack in the cable 14, so that the latter will always act to draw upon the bars.

It will be apparent from the foregoing description that I have devised an effective restraining harness for use in hoppling cows, the harness being so constructed that it may be placed upon the animal without interfering with its progress, or seriously discomforting the animal but at the same time preventing the animal from kicking.

To provide in the present device a means for holding a cow's tail, the central portion of the cross-bar is recessed, and secured to the bar at one side of the recess, and extending across said recess is a spring strip 20 having an intermediate coil 21 to increase its resiliency, and having its end at the other side of the recess laterally bent at 22 to extend into the cross-bar. An animal's tail may thus be readily inserted between the spring and bar upon flexing the spring outward, to be securely held in the recess of the bar upon release of the spring.

What I claim as my invention is:—

1. An animal restraining device, comprising in combination, a pair of side bars, a cross bar pivotally carrying the side bars, clamping members on the lower ends of the side bars for engagement around the hocks, and a continuous cable length passing around the animal's neck and in two strands along its back, and having its extremities connected to the upper ends of the side bars.

2. An animal restraining device, comprising in combination, a pair of side bars, a cross bar pivotally carrying the side bars, clamping members on the lower ends of the side bars for engagement around the hocks, a continuous cable length passing around the animal's neck and in two strands along its back, and having its extremities connected to the upper ends of the side bars, and flexible compensating devices loosely connected across said strands.

3. An animal restraining device, comprising in combination, a pair of side bars, a cross bar pivotally carrying the side bars, straps carried by the cross bar to encircle the animal's legs, clamping members on the lower ends of the side bars for engagement around the hocks, and a continuous cable length passing around the animal's neck and in two strands along its back, and having its extremities connected to the upper ends of the side bars.

4. An animal restraining device, comprising in combination, a pair of side bars, a cross bar pivotally carrying the side bars, straps carried by the cross bar to encircle the animal's legs, clamping members on the lower ends of the side bars for engagement around the hocks, and a continuous cable length passing around the animal's neck and in two strands along its back, and having its extremities connected to the upper ends of the side bars, and flexible connections between the cross bar at said straps and the side bars to limit the relative movement of the latter.

In testimony whereof, I affix my signature in the presence of two witnesses.

ANTON L. GROVE.

Witnesses:
H. E. SMITH,
HUGH MONAHAN.

Copies of this patent may be obtained for five cents each, by addressing the "Commissioner of Patents, Washington, D. C."